(12) United States Patent
Siegel

(10) Patent No.: US 12,270,603 B2
(45) Date of Patent: Apr. 8, 2025

(54) SYSTEM AND METHOD FOR ONLINE GAS ANALYTICAL PRESSURE-SWING ADSORPTION (PSA) CONTROL FOR LANDFILL OR BIOGAS SEPARATION

(71) Applicant: WM INTELLECTUAL PROPERTY HOLDINGS, L.L.C., Houston, TX (US)

(72) Inventor: Dennis Craig Siegel, Pleasant, PA (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/243,625

(22) Filed: Sep. 7, 2023

(65) Prior Publication Data

US 2024/0085103 A1    Mar. 14, 2024

Related U.S. Application Data

(60) Provisional application No. 63/405,300, filed on Sep. 9, 2022.

(51) Int. Cl.
F25J 3/02    (2006.01)

(52) U.S. Cl.
CPC ........... *F25J 3/0209* (2013.01); *F25J 3/0257* (2013.01); *F25J 3/0266* (2013.01); *F25J 2205/72* (2013.01); *F25J 2210/66* (2013.01)

(58) Field of Classification Search
CPC .. B01D 53/04; B01D 53/0454; B01D 53/047; B01D 2311/22; B01D 2315/18;
(Continued)

(56) References Cited

U.S. PATENT DOCUMENTS 6,663,777 B2    12/2003    Schimel
7,025,801 B2    4/2006    Monereau
(Continued)

FOREIGN PATENT DOCUMENTS

CN    101648101    2/2010
KR    101349424    1/2014
(Continued)

OTHER PUBLICATIONS

Giungato, Pasquale et al.; Improving recognition of odors in a waste management plant by using electronic noses with different technologies, gas chromatography-mass spectrometry/olfactometry and dynamic olfactometry; Journal of Cleaner Production 133; Jun. 3, 2016; pp. 1395-1402.

(Continued)

*Primary Examiner* — Youngsul Jeong
(74) *Attorney, Agent, or Firm* — Greenberg Traurig LLP

(57) ABSTRACT

A system and method for recovering high-quality biomethane (RNG) from biogas sources are provided. The system and method improve upon conventional practices and yield a biomethane product which meets strict gas pipeline quality specifications. An online sample is captured of a gas stream in near real-time at a pressure swing adsorption vessel, and the online sample is analyzed to detect the presence of one or more targeted products such as $CH_4$, $CO_2$ or $N_2$. The (Continued)

system and method are an improvement to the overall methane recovery efficiency for biogas processing facilities, specifically with regard to PSA control to prevent over or under saturation of the PSA media.

1 Claim, 3 Drawing Sheets

(58) Field of Classification Search
CPC ...... F25J 3/0209; F25J 3/0257; F25J 2210/66; F25J 3/0266; F25J 2205/72; C07C 7/12; C07C 7/00; C07C 7/13
See application file for complete search history.

(56) References Cited

U.S. PATENT DOCUMENTS

| | | | |
|---|---|---|---|
| 7,846,237 | B2 | 12/2010 | Wright et al. |
| 8,211,211 | B1 | 7/2012 | Knaebel |
| 9,969,949 | B1 | 5/2018 | Foody et al. |
| 11,311,856 | B2 | 4/2022 | Long et al. |
| 2015/0290575 | A1 | 10/2015 | Rothermel et al. |
| 2018/0318750 | A1 | 11/2018 | Zhong et al. |
| 2020/0216374 | A1 | 7/2020 | Honore et al. |
| 2021/0229027 | A1* | 7/2021 | Da Silva Barcia ............... B01D 53/0476 |
| 2022/0234975 | A1 | 7/2022 | Ridley, Jr. et al. |

FOREIGN PATENT DOCUMENTS

| | | |
|---|---|---|
| KR | 101717480 | 3/2017 |
| WO | 2011/059451 | 5/2011 |
| WO | WO-2011059451 A1 * | 5/2011 ......... B01D 53/0462 |
| WO | 2024/054590 | 3/2024 |

OTHER PUBLICATIONS

Abd, Ammar Ali et al.; Biogas upgrading to natural gas pipeline quality using pressure swing adsorption for CO2 separation over UiO-66: Experimental and dynamic modelling assessment; Chemical Engineering Journal 453; Oct. 14, 2022; 15 pages.
Jonca, Justyna et al.; Electronic Noses and Their Applications for Sensory and Analytical Measurements in theWaste Management Plants—A Review; Sensors 22, 1510; Feb. 15, 2022; 32 pages.
Pevida, Covadonga et al.; Adsorption Processes for CO2 Capture from Biogas Streams; Energies 16, 667; Jan. 5, 2023; 4 pages.
Alvarez-Gutierrez, Noelia et al.; Dynamic performance of biomass based carbons for CO2/CH4 separation. Approximation to a PSA process for biogas upgrading; May 9, 2016; 36 pages.
Kim, Min-Bae et al.; Kinetic Separation of Landfill Gas by a Two-Bed Pressure Swing Adsorption Process Packed with Carbon Molecular Sieve: Nonisothermal Operation; Industrial & Engineering Chemistry Research; vol. 45, No. 14; Jun. 8, 2006; pp. 5050-5058.
Santos, Monica P.S. et al.; Dynamic Study of the Pressure Swing Adsorption Process for Biogas Upgrading and Its Responses to Feed Disturbances; Industrial & Engineering Chemistry Research; Apr. 3, 2013; pp. 5445-5454.
European Patent Office; PCT International Search Report, issued in connection to PCT/US2023/032221; Jan. 4, 2024; 3 pages; Europe.
European Patent Office; PCT Written Opinion of the International Searching Authority, issued in connection to PCT/US2023/032221; Jan. 4, 2024; 5 pages; Europe.

* cited by examiner

SYSTEM AND METHOD FOR ONLINE GAS ANALYTICAL PRESSURE-SWING ADSORPTION (PSA) CONTROL FOR LANDFILL OR BIOGAS SEPARATION

RELATED APPLICATIONS

This application claims the benefit, and priority benefit, of U.S. Provisional Patent Application Ser. No. 63/405,300, filed Sep. 9, 2022, the disclosure and contents of which are incorporated by reference herein in its entirety.

BACKGROUND

1. Field of Invention

The presently disclosed subject matter relates generally to online gas analytical pressure-swing adsorption (PSA) control for landfill or biogas separation.

2. Description of the Related Art

Biogas is gas produced through the decomposition of organic matter in facilities such as solid waste landfills, wastewater treatment plants, or other anaerobic digesters. Biogas is composed primarily of methane and carbon dioxide, but also contains lesser amounts of other compounds. The gas is typically either flared to thermally destruct the combustible compounds or is beneficially utilized for its methane content.

Typical beneficial use applications for biogas include combustion of the biogas for industrial heating applications, combustion of the biogas for electricity generation, or processing the biogas to generate a methane (biomethane) product that can be injected into natural gas pipelines or used in compressed natural gas (CNG) or liquefied natural gas (LNG) vehicle fuel applications.

Biomethane which is injected into natural gas pipelines is commonly referred to as Renewable Natural Gas (RNG) and is a pipeline-quality gas that is fully interchangeable with conventional natural gas and thus can be used in natural gas vehicles. RNG is essentially biogas, the gaseous product of the decomposition of organic matter, that has been processed to purity standards.

Conventional means for processing biogas for biomethane production involve separation of methane and other compounds within the gas stream by passing the gas stream through various combinations of single-use adsorbent or scavenger beds, pressure-swing adsorption (PSA) packages, temperature-swing adsorption (TSA) packages, membranes, physical solvent-based absorbers, and chemical solvent-based absorbers.

Historically, conventional RNG facilities have had certain limitations with respect to operability and reliability. Specifically with respect to PSA control, over or under saturation of the PSA media is a common problem, and results in either product/target gas loss or increased plant product gas yield or BTU value.

Improvements in this field of technology are therefore desired.

SUMMARY

In accordance with the presently disclosed subject matter, various illustrative embodiments of a system and a method for recovering methane from a biogas-generating source using online gas analytical pressure-swing adsorption (PSA) control are described herein.

In certain illustrative embodiments, a method for recovering methane from a biogas-generating source is provided. At least one gas stream comprising a biogas can be accessed from a biogas-generating source. Sulfur can be removed from the gas stream. A majority of trace contaminants can be separated from the gas stream in a first pressure swing adsorption (PSA) vessel through preferential adsorption of the trace contaminants. Nitrogen and oxygen can be separated from the gas stream in a second pressure swing adsorption (PSA) vessel through preferential adsorption of methane. Adsorbed methane can be released through depressurization. Adsorbed methane can be further released through use of vacuum compressors. A methane product can be recovered from the gas stream.

In certain aspects, the preferential adsorption of trace contaminants and the preferential adsorption of methane can include capturing an online sample of the gas stream in near real-time at the first pressure swing adsorption vessel, capturing an online sample of the gas stream in near real-time at the second pressure swing adsorption vessel, analyzing the online samples from the first pressure swing adsorption vessel and the second pressure swing adsorption vessel to detect the presence of at least one targeted product, and increasing or decreasing the adsorption time in the first pressure swing adsorption vessel and/or the second pressure swing adsorption vessel based on results of the analysis. In certain aspects, the at least one targeted product can be methane, nitrogen, carbon dioxide and/or sulfur.

In certain aspects, the preferential adsorption of trace contaminants and the preferential adsorption of methane can include capturing an online sample of the gas stream in near real-time at a first pressure swing adsorption vessel, analyzing the online sample from the first pressure swing adsorption vessel to detect the presence of one or more targeted products, and redirecting flow of at least some of the gas stream from the first pressure swing adsorption vessel to a second pressure swing adsorption vessel based on the results of the analysis. The flow of all of the gas stream from the first pressure swing adsorption vessel can be redirected to a second pressure swing adsorption vessel based on the results of the analysis.

In certain aspects, the preferential adsorption of trace contaminants and the preferential adsorption of methane can include operating a first pressure swing adsorption vessel and a second pressure swing adsorption vessel in parallel, capturing an online sample of the gas stream in near real-time at the first pressure swing adsorption vessel, capturing an online sample of the gas stream in near real-time at the second pressure swing adsorption vessel, analyzing the online sample from the first pressure swing adsorption vessel to detect the presence of one or more targeted products, analyzing the online sample from the second pressure swing adsorption vessel to detect the presence of one or more targeted products, and adjusting the adsorption time in at least one of the first pressure swing adsorption vessel and the second pressure swing adsorption vessel based on results of the analysis. The adjusting of the adsorption time in at least one of the first pressure swing adsorption vessel and the second pressure swing adsorption vessel can include redirecting flow of at least some of the gas stream between the first pressure swing adsorption vessel and the second pressure swing adsorption vessel based on the results of the analysis. The adjusting of the adsorption time in at least one of the first pressure swing adsorption vessel and the second pressure swing adsorption vessel can also include redirecting flow of all of the gas stream between the first pressure swing adsorption vessel and the second pressure swing adsorption vessel based on the results of the analysis.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to a system and method for recovering high-quality biomethane (RNG) from biogas sources. The system and method improve upon conventional practices and yield a biomethane product which meets strict gas pipeline quality specifications.

Additionally, the system and method are an improvement to the overall methane recovery efficiency for biogas processing facilities, specifically with regard to PSA control to prevent over or under saturation of the PSA media.

As used herein, the phrase "biogas processing facility" shall not be limited to simply a single building, plant or other like facility, but shall also mean any collection of such buildings, plants or facilities, or any solid waste landfills, wastewater treatment plants, or other anaerobic digesters, as used to accomplish the subject matter described herein.

Figure 1:
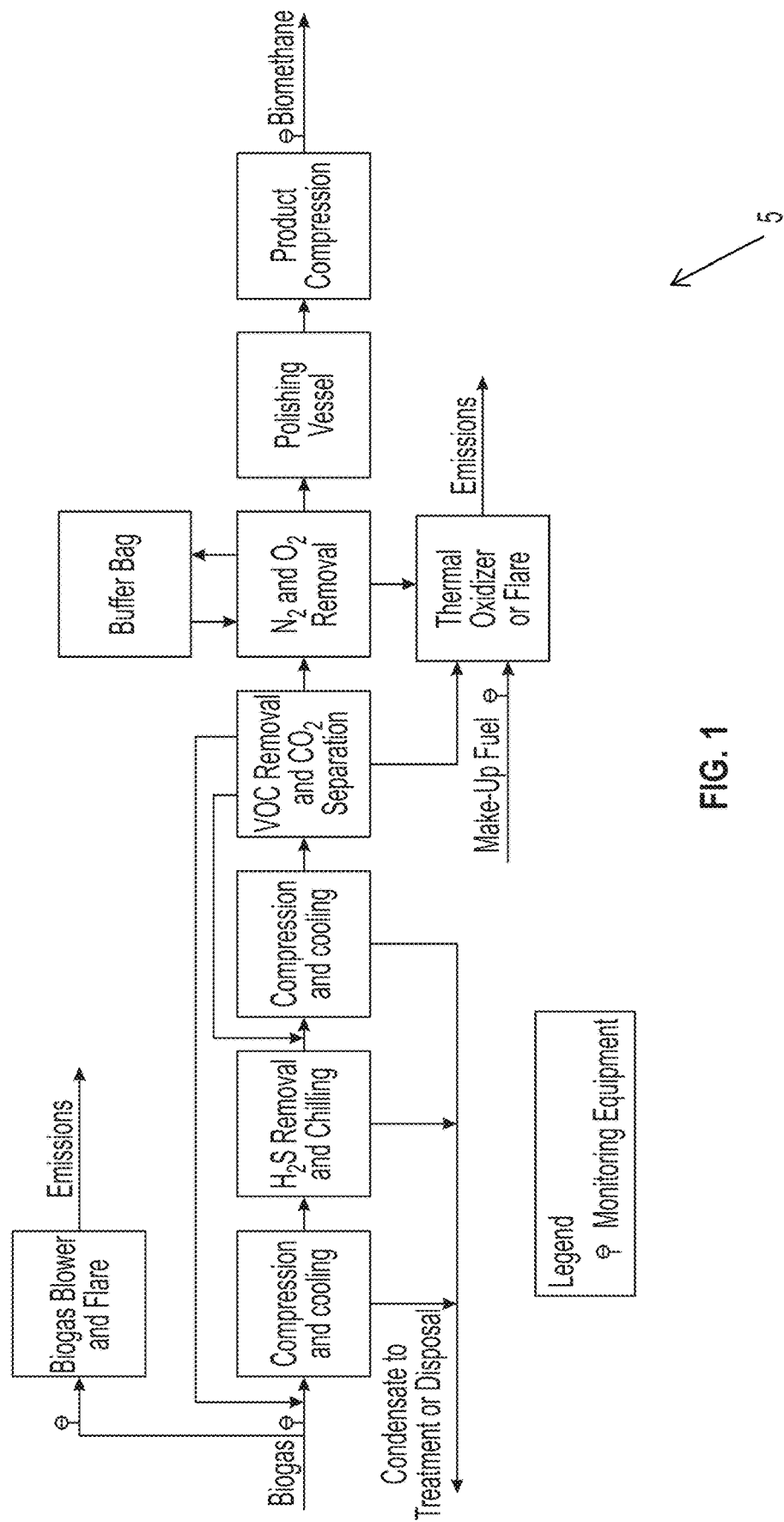
FIG. 1 is an example of a system and method for recovering high-quality biomethane (RNG) from biogas sources in accordance with an illustrative embodiment of the presently disclosed subject matter.

An illustrative embodiment of a system and method 5 for recovering high-quality biomethane (RNG) from biogas sources is shown in FIG. 1 herein. In certain illustrative embodiments, the system and method 5 can involve, without limitation, one or more of the following aspects: (i) accessing at least one gas stream comprising a biogas from a biogas-generating source; (ii) removing sulfur from the gas stream; (iii) separating a majority of trace contaminants from the gas stream in a first pressure swing adsorption (PSA) vessel through preferential adsorption of the trace contaminants; (iv) separating nitrogen and oxygen from the gas stream in a second pressure swing adsorption (PSA) vessel through preferential adsorption of methane; (v) releasing adsorbed methane through depressurization; (vi) further releasing adsorbed methane through use of vacuum compressors; and (vii) recovering a methane product from the gas stream.

In certain illustrative embodiments, the preferential adsorption of trace contaminants and the preferential adsorption of methane can include, without limitation, one or more of: (i) capturing an online sample of the gas stream in near real-time at the first pressure swing adsorption vessel; (ii) capturing an online sample of the gas stream in near real-time at the second pressure swing adsorption vessel; (iii) analyzing the online samples from the first pressure swing adsorption vessel and the second pressure swing adsorption vessel to detect the presence of one or more targeted product; and (iv) increasing or decreasing the adsorption time in the first pressure swing adsorption vessel and/or the second pressure swing adsorption vessel based on results of the analysis.

It should be noted that the system and method of FIG. 1 may be performed in different orders and/or sequences as dictated or permitted by the equipment described herein, and any alternative embodiments thereof. Other arrangements of the various "steps" and equipment can be utilized. In addition, not all "steps" or equipment described herein need be utilized in all embodiments. It should also be noted that certain particular equipment choices and/or arrangements of equipment and/or "steps" are preferred embodiments, and are materially distinguishable from and provide distinct advantages over previously known technologies.

Figure 2:
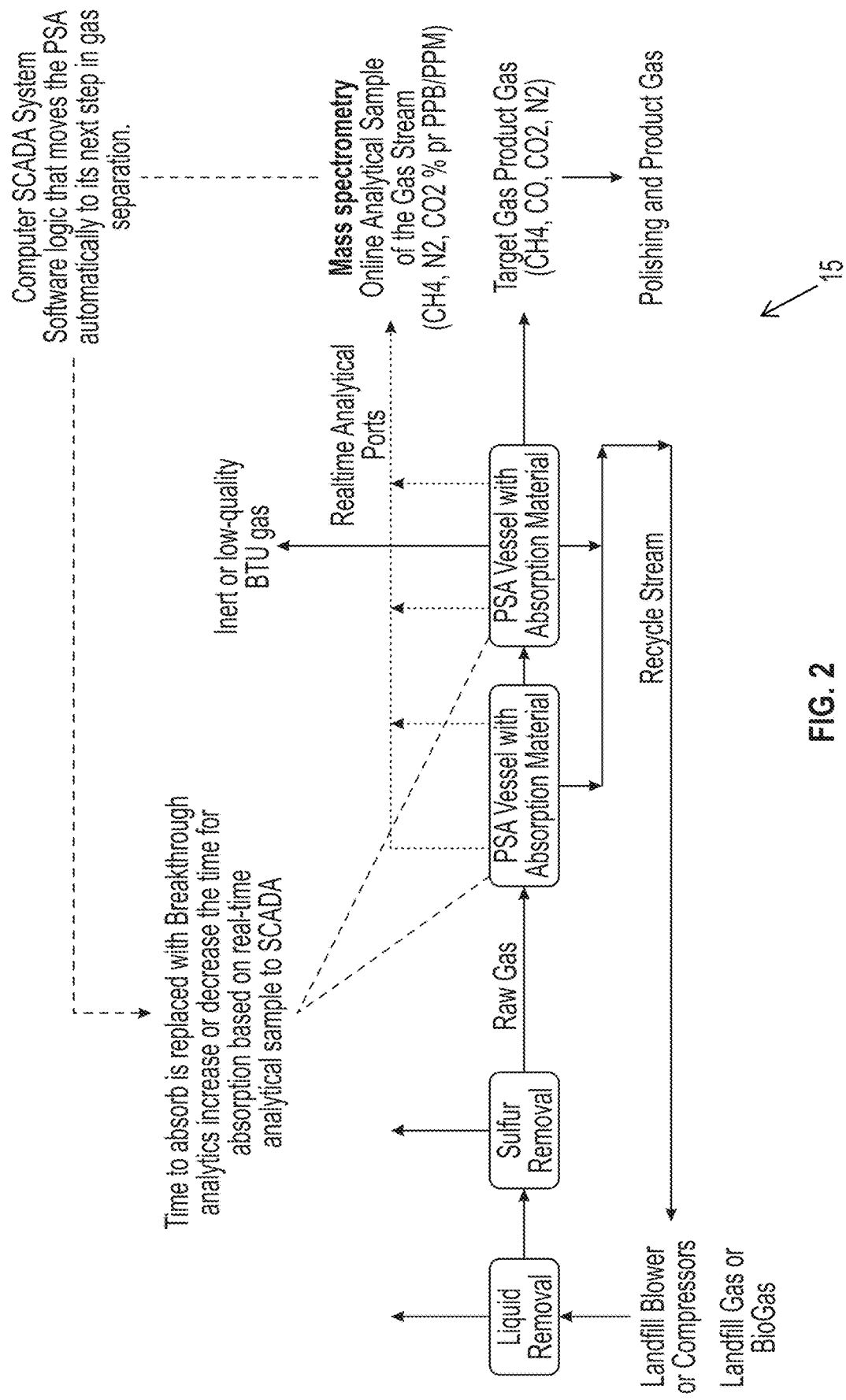
FIG. 2 is an example of biomethane recovery from a biogas source using pressure swing adsorption (PSA) and at least one online gas analyzer in accordance with an illustrative embodiment of the presently disclosed subject matter.

In certain illustrative embodiments, a method of biomethane recovery from a biogas source using pressure swing adsorption (PSA) and an online gas analyzer is provided. An illustrative embodiment of an improved system and method 15 is shown in FIG. 2 herein, wherein improvements are implemented to the more generalized system and method shown in FIG. 1.

In certain illustrative embodiments, a computer-based control system (SCADA) can monitor one or more of the following values inside a vessel that contains adsorption material designed to capture methane, carbon dioxide, and nitrogen compounds: (i) the active pressure (negative or positive), (ii) the active vessel temperature, (iii) the active methane ($CH_4$) level; (iv) the active carbon dioxide ($CO_2$) level, and/or (v) the active nitrogen ($N_2$) level. The presence of other targeted compounds can also be measured (e.g., sulfur).

Methane separation and purification are achieved by several steps including introducing a gas stream to adsorbent in a vessel where the pressure and temperature are controlled. In certain illustrative embodiments, an online analytical sample of the gas stream is taken in near real-time. The online analytical sample can be measured using online analytic instrumentation or tools such as mass spectrometry, gas chromatograph, commercially available $CO_2$ or $CH_4$ analyzers or monitors, or another means of real-time analytical measurement. The mass spectrometry or other tools can be connected by an industrial protocol to the process plant's computer-based control system (SCADA).

In certain illustrative embodiments, the computer-based (SCADA) control system measures the analytical gas sample for what is called product "breakthrough." Breakthrough is an analytical detection by the SCADA system of the gas composition of a targeted product to optimize material or media adsorption capacity or yield. The targeted product can be, for example, methane ($CH_4$), carbon dioxide ($CO_2$), and/or nitrogen ($N_2$), or other targeted compounds. Once the target gas compound is detected in the online analytical sample by the SCADA system, the system alerts a user that the material or media adsorption is complete and separation of gas molecules is no longer occurring.

Prior analytical methods have focused primarily on time (e.g., residence time in the vessel) and/or temperature as indicators of media saturation. However, these indicators have proven to be ineffective and have not provided results with the required accuracy or immediacy. For example, when time is used as an indicator, the pre-set time (e.g., 10 minutes) is only an estimate of when saturation will occur, and actual media saturation may occur much sooner (e.g., 6 minutes or 8 minutes) or much later (e.g., 12 minutes), so electricity is either wasted while the remaining time elapses and no adsorption is occurring, or the full capacity of the media is not being utilized. When temperature is used as an indicator, the reading can be negatively impacted by, e.g., external temperature conditions, which may heat up the vessel or the instrumentation and cause inaccuracies.

In certain illustrative embodiments, breakthrough detection within the computer control SCADA system using the analytical methods described herein generates a subsequent pressure swing adsorption (PSA) step to provide efficiency and a high-quality capture of the target gas compound to completely fill the adsorption material without under or over utilizing the material.

Pressure swing adsorption is a step process in which a media adsorbs a compound ($CH_4$, CO, $CO_2$, $N_2$). In certain illustrative embodiments, the step process can be controlled by online or real-time analytical gas from each PSA tank or vessel. This allows the PSA step to remain in or accelerate each step in the adsorption process based on breakthrough detection. By slowing or accelerating each PSA step based on a real-time gas analytical measurement data feed to SCADA, over or under-saturation of the PSA media is prevented. Over or under saturation of the PSA media results in either product/target gas loss or increased plant product gas yield or BTU value.

Figure 3:
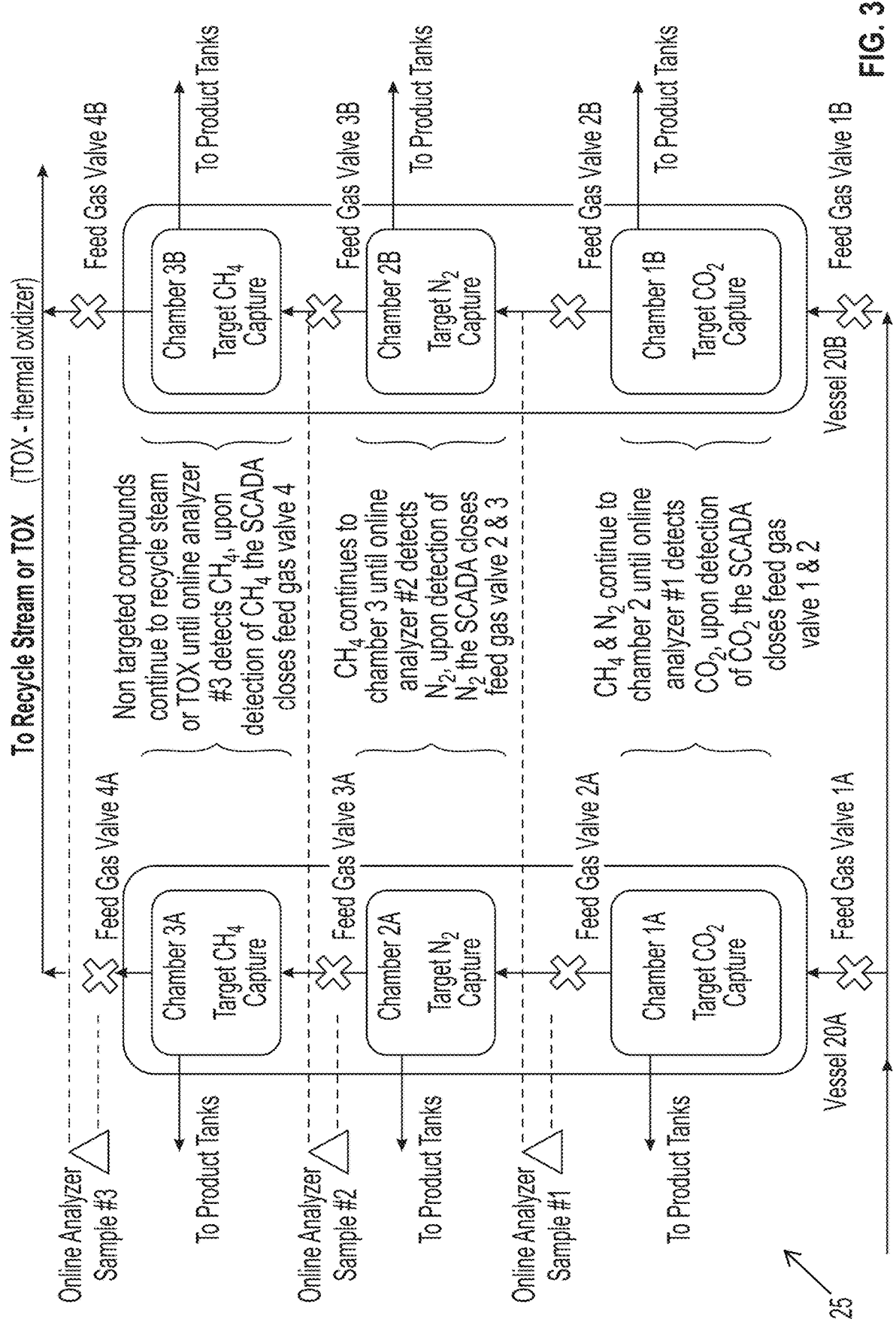
FIG. 3 is an example of a control scheme for online analytical pressure-swing adsorption (PSA) in accordance with an illustrative embodiment of the presently disclosed subject matter.

An illustrative embodiment of a system and method 25 for recovering high-quality biomethane (RNG) from biogas sources is shown in FIG. 3 herein. In certain illustrative embodiments, the system and method 25 can involve, without limitation, one or more of the following aspects: (i) accessing at least one gas stream comprising a biogas from a biogas-generating source; (ii) removing sulfur from the gas stream; (iii) separating a majority of trace contaminants from the gas stream through preferential adsorption of the trace contaminants; (iv) separating nitrogen and oxygen from the gas stream through preferential adsorption of methane; (v) releasing adsorbed methane through depressurization; (vi) further releasing adsorbed methane through use of vacuum compressors; and (vii) recovering a methane product from the gas stream.

In certain illustrative embodiments, the preferential adsorption of trace contaminants and the preferential adsorption of methane can include, without limitation, one or more of: (i) capturing an online sample of the gas stream in near real-time at a first pressure swing adsorption vessel; (ii) analyzing the online sample from the first pressure swing adsorption vessel to detect the presence of one or more targeted products; and (iii) adjusting or redirecting flow of at least some of (and in some embodiments, all of) the gas stream from the first pressure swing adsorption vessel to a second pressure swing adsorption vessel based on the results of the analysis.

In certain illustrative embodiments, the preferential adsorption of trace contaminants and the preferential adsorption of methane can also include, without limitation, one or more of: (i) operating a first pressure swing adsorption vessel and a second pressure swing adsorption vessel in parallel; (ii) capturing an online sample of the gas stream in near real-time at the first pressure swing adsorption vessel; (iii) capturing an online sample of the gas stream in near real-time at the second pressure swing adsorption vessel; (iv) analyzing the online sample from the first pressure swing adsorption vessel to detect the presence of one or more targeted products; (v) analyzing the online sample from the second pressure swing adsorption vessel to detect the presence of one or more targeted products; and (vi) increasing or decreasing the adsorption time in the first pressure swing adsorption vessel and/or the second pressure swing adsorption vessel based on results of the analysis. Increasing or decreasing the adsorption time in the first pressure swing adsorption vessel and/or the second pressure swing adsorption vessel can involve, for example, adjusting or redirecting flow of at least some of (and in some embodiments, all of) the gas stream between the first pressure swing adsorption vessel and a second pressure swing adsorption vessel based on the results of the analysis.

In the illustrative embodiment of FIG. 3, the feed gas is directed to two PSA vessels 20A and 20B, which can be operated in parallel or in sequence. Gas flow is controlled by feed gas valves 1A and 1B at the entrance of vessels 20A and 20B. Each PSA vessel contains a plurality of chambers, wherein each chamber is designated for targeted capture of a particular material (e.g., methane ($CH_4$), carbon dioxide ($CO_2$), and/or nitrogen ($N_2$)). Vessel 20A includes chambers 1A, 2A and 3A. Vessel 20B includes chambers 1B, 2B and 3B. The media in each chamber is selected based upon the adsorption needs for a particular material at that stage of the process. Gas flow between the chambers in each vessel can be controlled by feed gas valves 1A, 2A, 3A and 4A for vessel 20A, and feed gas valves 1B, 2B, 3B and 4B for vessel 20B, on the gas lines between the chambers. Online analytic instrumentation is located between the chambers in each vessel to take online analytical samples for purposes of, e.g., detecting undesired breakthrough of targeted products. For example, breakthrough of $CO_2$ at the outlet of chamber 1A of vessel 20A and/or 1B of vessel 2B during operations is an indication that the media is saturated and is no longer adsorbing the targeted material for that particular chamber. If breakthrough is detected at any particular stage, then gas flow can be, e.g., redirected from one PSA vessel to the other PSA vessel, or gas flow to the vessel affected by breakthrough can be reduced or shut off so that some or all subsequent gas goes to the other vessel, or gas flow to, or between, the two vessels can be adjusted, or other appropriate compensating steps can be taken, depending upon the operational needs. At all stages of the process, the monitoring and regulating can be performed by a computer-based control system using supervisory control and data acquisition (SCADA).

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims

What is claimed is:

1. A method for recovering methane from a biogas-generating source, comprising:
   accessing at least one gas stream comprising a biogas from a biogas-generating source;
   removing sulfur from the gas stream;
   separating a certain amount of trace contaminants from the gas stream, after removing sulfur from the gas stream, through preferential adsorption of the trace contaminants;
   separating nitrogen and oxygen from the trace contaminants-depleted gas stream through preferential adsorption of methane;
   releasing adsorbed methane from adsorbent through depressurization;
   further releasing adsorbed methane from adsorbent through use of vacuum compressors; and
   recovering a methane product from the gas stream,
   wherein the preferential adsorption of trace contaminants and the preferential adsorption of methane comprises:
   operating a first pressure swing adsorption vessel and a second pressure swing adsorption vessel in parallel;
   capturing an online sample of a gas stream in near real-time at the first pressure swing adsorption vessel;
   capturing an online sample of a gas stream in near real-time at the second pressure swing adsorption vessel;
   analyzing the online sample from the first pressure swing adsorption vessel to detect the presence of one or more targeted products;
   analyzing the online sample from the second pressure swing adsorption vessel to detect the presence of one or more targeted products; and
   adjusting adsorption time in one of the first pressure swing adsorption vessel and the second pressure swing adsorption vessel based on results of the analysis,
   and wherein adjusting the adsorption time in one of the first pressure swing adsorption vessel and the second pressure swing adsorption vessel comprises: redirecting flow of some of the gas stream between the first pressure swing adsorption vessel and the second pressure swing adsorption vessel based on the results of the analysis.

* * * * *